Sept. 29, 1959

J. A. BAUER

TIME DELAY CIRCUIT

Filed Jan. 7, 1957

2,906,926

INVENTOR.
John A. Bauer
BY
[signature]
ATTORNEY

United States Patent Office 2,906,926

Patented Sept. 29, 1959

2,906,926

TIME DELAY CIRCUIT

John August Bauer, San Fernando, Calif., assignor to Bendix Aviation Corporation, North Hollywood, Calif., a corporation of Delaware Application January 7, 1957, Serial No. 632,920

2 Claims. (Cl. 317—148.5)

This invention relates to time delay circuits for delaying an electrical signal by a predetermined interval of time.

An object of this invention is to provide an improved time delay circuit for effecting a variable amount of time delay in an electrical signal.

Another object is to provide a time delay relay circuit which, after operating to perform a delayed switching operation, rapidly resets to prepare for another operation.

Another object is to provide time delay relay circuit capable of stable operation under adverse conditions, including vibration and variations in operating voltage.

The need often arises for a time delay circuit of simple structure which can delay an electrical signal, to perform switching, or other operations a predetermined interval of time after the signal is received. The present invention provides such a time delay circuit and includes: a resistance-capacity circuit requiring a finite charging time to reach a predetermined state, and a threshold circuit, such as a transistor amplifier, which senses the state of the circuit and passes a signal when the predetermined state is reached. The mode of connecting the threshold circuit provides a discharge path for the resistance-capacity circuit to enable that circuit to rapidly prepare for another operation.

A full understanding of the invention may be had from the following detailed description with reference to the drawing, in which.

Figure 1:
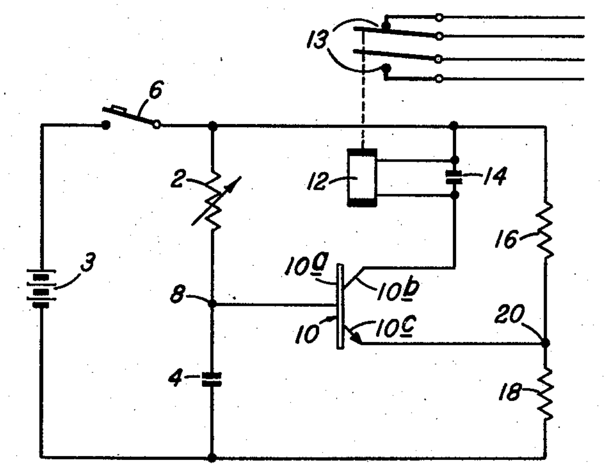
Fig. 1 is a schematic diagram of a system incorporating the invention.

Fig. 1 of the drawings shows a series resistance-capacity circuit including a variable resistor 2 and a capacitor 4. The circuit is adapted to be energized through a switch 6 from a source 3 of direct current voltage, here shown as a battery. A junction point 8 between the resistor 2 and the capacitor 4 is connected to the base electrode 10*a* of an NPN junction transistor 10 such as to partially govern the current flow through the collector electrode 10*b* thereof. The collector electrode 10*b* is connected through a relay 12 to the source 3 via the switch 6. The relay 12 may have numerous contacts 13. A capacitor 14 is connected across the relay 12 to reduce the voltage transient of the large inductive load presented by the relay 12 to the transistor 10 on opening the switch 6. Also connected to be energized directly through the switch 6 is a voltage dividing network including resistors 16 and 18. The junction 20 of the resistors 16 and 18 is connected to the emitter electrode 10*c* of the transistor 10 to complete the connections of the transistor in a grounded-emitter amplifier configuration.

Figure 2:
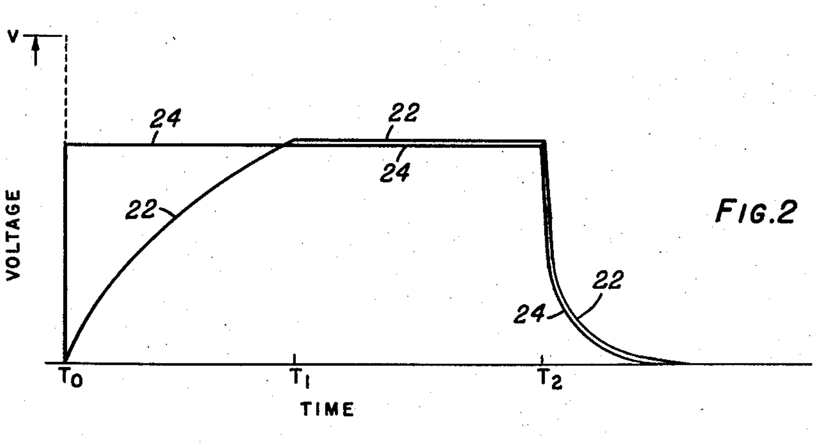
Fig. 2 is a graph representative of voltage changes during the operation of the system of Fig. 1.

Reference will now be had to the curves of Fig. 2 to explain the operation of the system of Fig. 1. The curves of Fig. 2 are plotted with voltage as ordinate and time as abscissa.

At the instant $T_0$, when the switch 6 is closed, a direct current flows through the variable resistor 2 to charge the capacitor 4 exponentially toward the voltage of the source 3. An exponential voltage wave 22, as shown in Fig. 2, is therefore formed at the junction point 8 which is applied to the base electrode of the transistor 10.

Also, beginning at the instant $T_0$, a current flows through the resistors 16 and 18 to produce at the junction 20 a constant voltage of value represented by the horizontal line 24 of Fig. 2. The voltage appearing at the junction 20 will be some fractional value of the magnitude of the voltage of the source 3, depending upon the relative magnitudes of the resistors 16 and 18, and is applied to the emitter electrode 10*c* of the transistor 10. The current through the collector electrode of the transistor 10 is thereby controlled by the voltage difference between the junctions 8 and 20.

The transistor 10 acts as a grounded-emitter amplifier and conducts heavily between its collector and emitter electrodes when the voltage (wave 22) applied to the base electrode slightly exceeds the voltage (wave 24) applied to the emitter electrode. Therefore the current through the collector electrode 10*b* of the transistor 10 is cut off until the voltage on the capacitor 4 builds up to a level slightly above the voltage at the junction 20, whereupon the transistor 10 is rendered conductive. The time when the transistor 10 is rendered conductive is indicated as $T_1$ in Fig. 2. Beginning at the time $T_1$, a current flows through the collector electrode of the transistor 10 and relay 12. The contacts of the relay 12 are therefore motivated to effect a switching operation delayed a predetermined interval of time from the switching operation performed by closing the switch 6.

During conduction of the transistor 10, it provides a path of low resistance from junction 8 to junction 20, so that the wave 22 becomes a horizontal line slightly above the line 24.

When the switch 6 is opened, at a time $T_2$, the relay 12 is immediately de-energized, and the contacts of the relay return to normal position. The current through the resistor 16 also drops to zero, and the capacitor 4 rapidly discharges (exponentially) through the transistor 10 via the base-emitter path. With the rapid discharge of the capacitor 4, the circuit is again placed in a condition for operation. During discharge, the potentials at points 8 and 20 drop together, as shown in Fig. 2.

The amount of time delay produced by the circuit is that between the instants $T_0$ and $T_1$, and is dependent upon the charging rate of the capacitor 4 through the resistor 2. In view of this, variations of the resistance offered by the resistor 2 will vary the charging rate of the capacitor 4 and thus vary the time delay incurred.

A feature of this invention is that variations in the potential of the source 3, do not cause the predetermined time delay to vary substantially. The rate of change of the voltage at the junction point 8 will be proportional to the magnitude of the direct current voltage of the source 3. That is, the slope of the curve 22 will vary with variations in the voltage source 3. However, the voltage at the junction 20, as shown by the curve 24, is also proportional to the direct current voltage of the source 3. It may therefore be seen that if the voltage of the source 3 increases, the slope of the curve 22 will increase; however, the height of the line 24 will also increase, the result being that the interval between $T_0$ and $T_1$ will tend to be maintained.

Similarly, if the voltage of the source 3 decreases, the slope of the curve 22 will decrease; however, the height of the line 24 will also decrease and again the interval between $T_0$ and $T_1$ will tend to remain constant.

It may thus be seen that this invention provides a simple time delay circuit which provides variable amounts of time delay under adverse operating conditions.

Although for the purpose of explaining the invention a particular embodiment thereof has been shown and described, obvious modifications will occur to a person skilled in the art, and I do not desire to be limited to the exact details shown and described.

I claim:

1. Apparatus of the type described comprising: a control device having first, second and third terminals, in which the resistance between the first terminal and the second terminal and the resistance between the first terminal and the third terminal vary from high to low values in response to increase of the potential of the third terminal to a predetermined value with respect to that of said first terminal; first and second conductors; voltage-dividing means connected to said conductors and to said first terminal for applying to said first terminal a potential less than but proportional to a potential applied to said conductors; a capacitor and a resistance connected in series between said first and second conductors and means connecting the junction of said capacitor and resistor to said third terminal; a load element connecting said second conductor to said second terminal; and means for applying an energizing potential between said first and second conductors.

2. A time-delay device comprising: a reactance circuit requiring a finite charging time to reach a predetermined level; a source of potential and switching means for energizing said reactance circuit from said source; load means; a voltage-dividing circuit shunting said reactance circuit and having a tap thereon yielding a potential of approximately said predetermined level; a switching device having first, second and third terminals connected to said tap, load means and reactance circuit, respectively, and responsive to increase of potential on said third terminal to a fixed level relative to the potential of said first terminal to produce low resistance paths between said first and second terminals and said first and third terminals, respectively.

References Cited in the file of this patent

UNITED STATES PATENTS

| | | |
|---|---|---|
| 2,567,928 | Farmer | Sept. 18, 1951 |
| 2,577,137 | Low | Dec. 4, 1951 |
| 2,641,701 | Moore | June 9, 1953 |

OTHER REFERENCES

Garner: Radio and Television News, October, 1953, pp. 68–69.